United States Patent [19]

Besik

[11] 4,167,479
[45] Sep. 11, 1979

[54] PROCESS FOR PURIFYING WASTE WATERS

[76] Inventor: Ferdinand Besik, 3243 Chokecherry Cresc., Willowdale, Ontario, Canada

[21] Appl. No.: 889,880

[22] Filed: Mar. 24, 1978

Related U.S. Application Data

[63] Continuation-in-part of Ser. No. 730,815, Oct. 8, 1976, abandoned.

[51] Int. Cl.$^2$ .............................................. C02C 1/04
[52] U.S. Cl. .......................................... 210/7; 210/14; 210/16; 210/17; 210/18; 210/20; 210/DIG. 28; 210/DIG. 29
[58] Field of Search ....................... 210/15, 17, 18, 14, 210/4–8, 3, 16, 11, 39, 40, 20, 150, 151, DIG. 28, DIG. 29, 28, 37 R

[56] References Cited

U.S. PATENT DOCUMENTS

| | | | |
|---|---|---|---|
| 3,480,144 | 11/1969 | Barth et al. | 210/DIG. 29 |
| 3,697,420 | 10/1972 | Blaisdell et al. | 210/42 S |
| 3,846,289 | 11/1974 | Jeris et al. | 210/DIG. 28 |
| 3,855,120 | 12/1974 | Garbo | 210/17 |
| 3,904,518 | 9/1975 | Hutton et al. | 210/40 |
| 3,957,632 | 5/1976 | Knopp et al. | 210/18 |
| 3,980,556 | 9/1976 | Besik | 210/17 |

FOREIGN PATENT DOCUMENTS

| | | | |
|---|---|---|---|
| 147860 | 8/1952 | Australia | 210/6 |
| 50-43750 | 4/1975 | Japan | 210/11 |

*Primary Examiner*—Benoît Castel

[57] ABSTRACT

A purification process for the removal of biodegradable suspended and dissolved organic solids, nitrogenous compounds and phosphates from contaminated water by biological and chemical reactions carried out simultaneously in active media of a biological waste treatment reaction system. The process comprises adding a finely divided mineral or mixture of minerals to the reaction system. Various levels of oxygen in the system are maintained to provide for biological oxidation of organic compounds and biological nitrification of nitrogen containing compounds and subsequent biological denitrification of the formed nitrites and nitrates. The selection of the mineral is such that through its dissociation in the system, the released metal ions are capable of precipitating a portion of ionic species, particularly phosphates present in the processed waste water, at the operating pH range of 6 to 8. The surfaces of the mineral attract micro-organisms and suspended solids to facilitate and enhance simultaneously occuring biological and chemical reactions.

9 Claims, 5 Drawing Figures

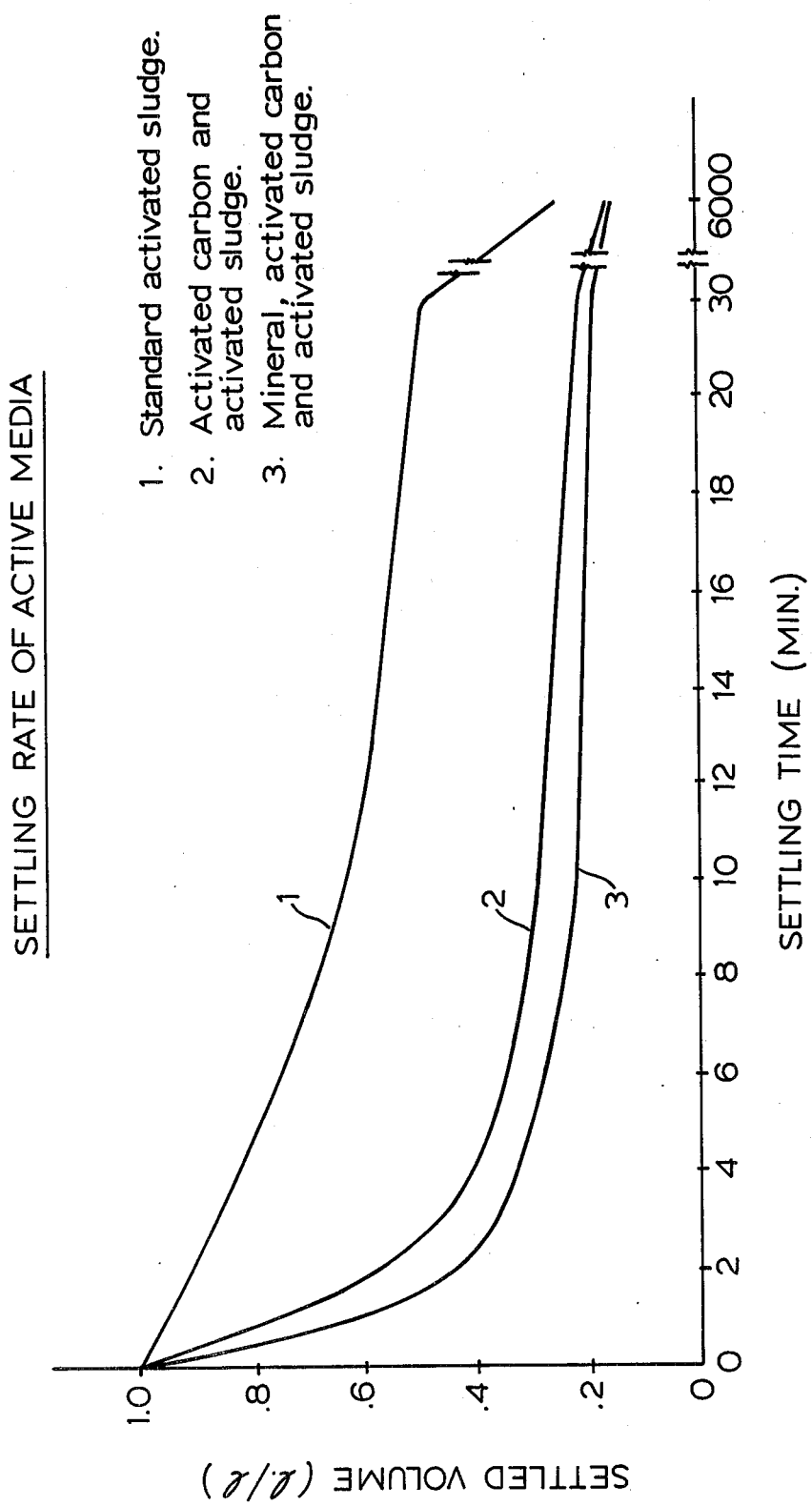

PROCESS FOR PURIFYING WASTE WATERS

This is a continuation-in-part of applicaton Ser. No. 730,815 filed Oct. 8, 1976 (now abandoned).

FIELD OF INVENTION

This invention relates to a purification process for the removal of bio-degradable suspended and dissolved organic solids, nitrogenous compounds and phosphates from waste waters by simultaneously occuring biological and chemical reactions.

BACKGROUND OF THE INVENTION

It is important to remove contaminants from raw and/or waste waters before discharge of such waters, because contaminants such as those found in sewage waters, various industrial waste waters, storm sewer waters and the like, have a destructive effect on the environment. Existing processes for removing such contaminants from waste waters entail breaking down the biodegradable contaminants by the action of active micro-organisms and removing other contaminants by physical and/or chemical processes. With such processes, several different process steps are carried out in separate stages of a treatment system requiring relatively expensive equipment and the use of substantial areas of land. These types of treatment are complex, have inherent inefficencies and are not readily scaled down for use in treating small volumes of waste waters at a site of limited size.

It has been proposed to use particulate matter in sewage treatment systems. The particulate matter such as activated carbon, flyash, coal, volcanic cinders and calcium carbonate function as adsorbants to adsorb suspended solids in the waste waters and thereby remove such suspended solids from the waste waters. The waste sludge containing the particulate matter, may be discarded or processed to recover the particulate matter from the waste sludge for a return to the system. None of the past proposals have contemplated the use in a sewage treatment system operating at pH range of 6 to 8 of a finely divided mineral or combination of minerals. Such selected minerals must be capable through dissociation, of releasing metal ions which precipitate phosphates in the waste waters simultaneously with the biological reactions to achieve the simultaneous removal of bio-degradable suspended and dissolved organic solids, nitrogenous compounds and phosphates within a single reaction system.

It is therefore an object of the invention to provide a process for removing contaminants from the contaminated waters with a minimum number of process steps.

It is another object of the invention to provide a waste treatment process where various organic suspended solids, nitrogen containing compounds, and phosphorous containing compounds are removed from the waste waters by co-acting and simultaneously occuring biological and chemical reactions.

It is yet another object of the invention to provide a process for purifying contaminated waters, which is capable of unattended operation and readily lends itself to use in large municipal waste water treatment systems, apartment size waste water treatment systems, single family dwelling waste water treatment systems, waste treatment systems on boats, ships, recreational vehicles and the like, in shopping centres, airports, recreational areas, such as camps, waste treatment systems in food processing industries, fish hatcheries, pulp and paper industries, coke processing stages of steel mills, paint industry, and in any other type of industry, domestic area or raw water purification wherein partially or wholly bio-degradable contaminants and certain non-bio-degradable contaminants are to be removed.

It is a further object of the invention to provide a purifying process for waste water where compared to existing systems the waste water may be processed in a more efficient manner to thereby reduce the physical size of a treatment system.

SUMMARY OF THE INVENTION

These objects, advantages and features of the invention are attained by contacting contaminated waters with an active media having varying dissolved oxygen levels along its flow path through the reaction system. The active media includes, among other things, active micro-organisms in activated sludge and one or more powdered or finely divided minerals. The presence of mineral in the active media assists in precipitating phosphates in the waste water and enhances the concentration and distribution of the active micro-organisms within the reaction system to increase the efficiency of microbial degradation of bio-degradable contaminants and the biological transformation of nitrogen containing compounds. The selection of powdered mineral or minerals is pre-determined by their being non-toxic to the active micro-organisms and by their low rate of dissociation, the released metal ions must be capable of precipitating the phosphates at the systems pH range of 6 to 8. The minerals have limited solubility or are essentially insoluble in the processed waste water. They will, however, dissociate to a certain degree to release the necessary metal ions. The released metal ions aside from precipitating phosphates also assist in the control of the pH of the processed waste water to maintain it in the range of 6 to 8.

Replenishing of the minerals in the system is kept to a minimum due to the manner in which excess sludge is withdrawn from the system and secondly due to the essentially insoluble nature of the minerals. It is understood however that from time to time in withdrawing sludge from the system the finer mineral particles may be embedded in the withdrawn sludge to necessitate addition of new mineral to the system. It has been found that mineral addition is infrequent and is done either on a yearly or half-yearly basis or an irregular basis depending upon the process operating conditions.

According to an aspect of the invention the purification process comprises the following steps of adding a finely divided mineral or mixture of minerals to the system on an infrequent or irregular basis. The mineral has a particle size less than 50 mesh, United States Standard Screens and is added in an amount to provide a concentration in the active media ranging from approximately 10 gm./l. up to 200 gm./l. The selection of the mineral is determined by the characteristics of:

(a) its being non-toxic to the micro-organisms;
(b) having surfaces which attract micro-organisms and adsorb organic compounds and phosphates to assist in and expedite the simultaneously occuring biological and chemical reactions; and
(c) having limited solubility in the processed waste waters the released metal ions react with phosphate ions present in the processed waste waters to form insoluble metal phosphates at the reactor system pH range of 6 to 8.

A mixed microbial population is built up in the system by retaining and growing in the reactor the various micro-organisms present in the waste waters on the surfaces of the mineral particles retained in the reactor system.

The active media which includes the mixed microbial population and powdered minerals is circulated through the reactor system by the use of forced air. The reactor system comprises at least two zones in which biological oxidation, biological nitrification and biological denitrification reactions each occur simultaneously with the chemical reactions throughout the system where the concentration of free metal ions is at the mineral's solubility levels. The contaminated waters are caused to flow through the first zone to contact such waters with the active media. The conditions in the first zone are established so that (a) the concentration of dissolved oxygen in the zone's upstream region is maintained at approximately 1 mg./l. to 2 mg./l. to support the biological oxidation of biodegradable organic solids to carbon dioxide and the biological oxidation of nitrogeneous compounds to nitrites and nitrates;

(b) the duration which such waters remain in said first zone as they flow therethrough is controlled so that the biological reactions reduce concentration of dissolved oxygen in the downstream region of the first zone to below 1 mg./l. to thereby induce biological denitrification reactions.

At least a portion of the waste waters and active media from the first zone, are caused to flow upwardly through a second zone, which is a sludge settling region. The dissolved oxygen content in the second zone is maintained below 1 mg./l. wherein the biological denitrification reactions are continued for reducing the concentration of nitrites and nitrates which reduces further the dissolved oxygen content to less than 0.5 mg./l. The upward rate of flow of the waters in the second zone is controlled to provide a quiescent region in the upper portion thereof which permits most of the active media to separate from the waters prior to discharge of the waters from the reactor system.

Phosphate ions are precipitated simultaneously with the biological reactions in the zones by the metal ions which are released due to dissociation of the mineral. This lowers the concentration of phosphate ions in the reaction system.

The discharged waters may be transferred to a clarification zone which may be adapted to continue biological and chemical reaction to remove remaining contaminants from the waters. According to a preferred aspect of the invention, the clarifier stage may be in combination a reactor-clarifier having first and second vertically extending chambers. The second chamber is in fluid communication with the first chamber at the lower end of the first chamber. A flow path of liquid is established downwardly through the first chamber and upwardly through the second chamber by withdrawing and aerating a portion of the active media from the second chamber and returning it to the upstream end of the first chamber. The upward flow in the second chamber is suitable for forming a fluidized bed of active media therein. The suspended solids in the upward flow of the processed waters of the second chamber are separated from the water above the fluidized bed to provide clarified water suitable for discharge.

The use of one or more powdered minerals in waste treatment systems is particularly useful in fluidized bed reaction systems. The minerals in their ability to attract and collect on their surfaces the active micro-organisms, enhance the distribution of such micro-organisms in the fluidized bed as waste waters are passed therethrough. Due to the relative high density of the mineral, the concentration of the mixed microbial population in the fluidized bed is substantially increased. This permits the treatment of higher flow rates of water than could be treated by prior processes.

DESCRIPTION OF THE DRAWINGS

The aforementioned and other objects, advantages and features of the invention will become apparent in the following detailed description of the preferred embodiments as shown in the drawings wherein:

FIG. 5 is a graph showing the settling rates of various forms of active media.

DETAILED DESCRIPTION OF THE PREFERRED PROCESS OF THE INVENTION

Figure 1:
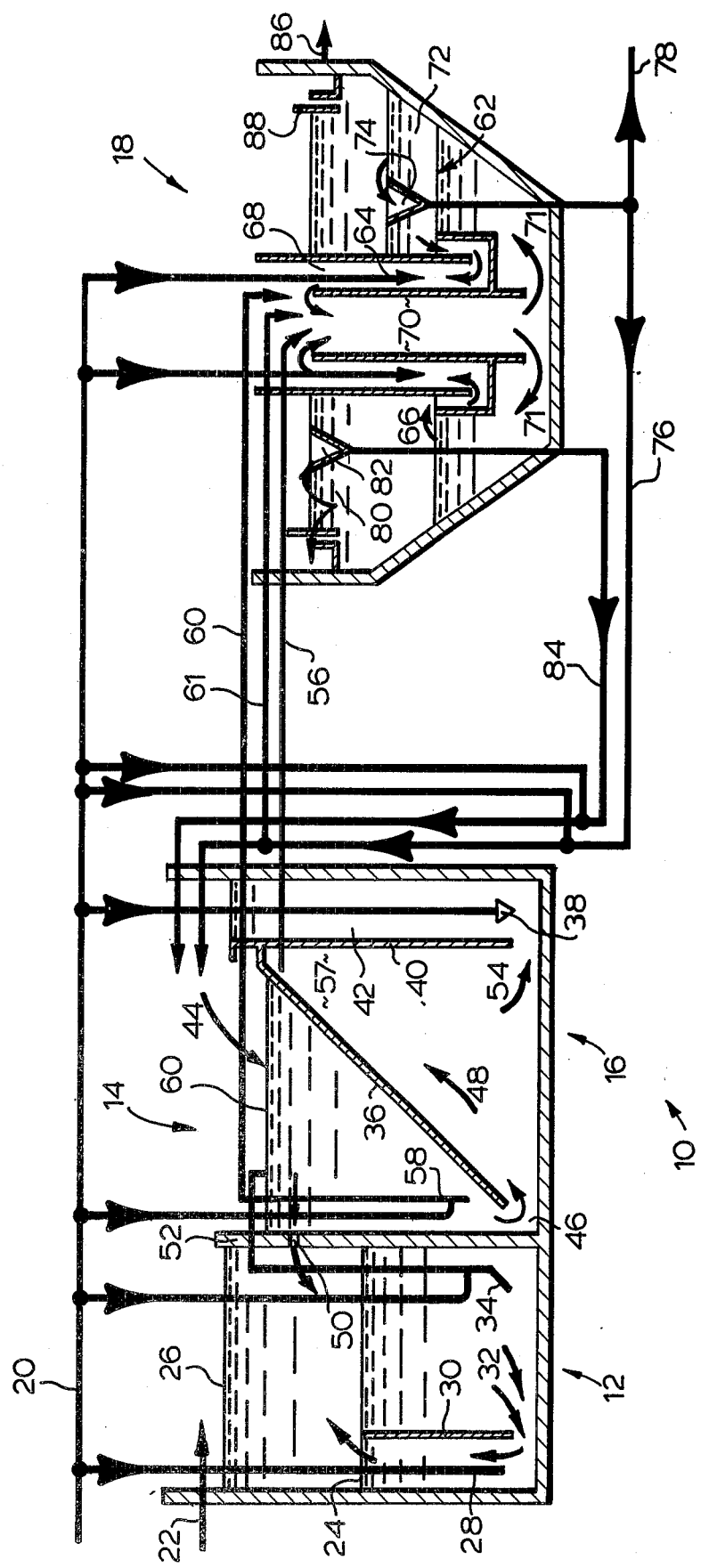
FIG. 1 is a schematic representation of apparatus in which the process of the invention may be carried out.

It is not fully understood how the powdered minerals combine with the active micro-organisms and affect the simultaneously occuring biological-chemical reactions, however, it is theorized that the powdered minerals provide surfaces on which active micro-organisms locate to thereby increase the density of the formed active sludge. The released metal ions of the minerals react with the phosphate ions present to form precipitates. The mineral expedites separation of the sludge from the waste waters and enhances the distribution of the micro-organisms in the active sludge as waste waters flow therethrough and enhances the yield from the simultaneously occuring chemical and biological reactions. As the population of the micro-organisms increases, the mineral serves to retain the micro-organisms in the sludge and this helps to maintain a high concentration of micro-organisms in the reaction system. There is a wide variety of minerals which are suitable for use in this process. As mentioned the selection of mineral or combination of minerals to be used in the process are determined by certain characteristics in that they be non-toxic to the micro-organisms, be finely divided, have limited solubility in the waste waters and by their dissociation, the released metal ions, be capable of forming phosphate precipitates in the waste waters at the systems operational pH range of 6 to 8. With these guidlines it can be appreciated that a host of minerals are available which can be readily used in the process. The following are suggested minerals which may be used and are in no way to be interpreted as limiting to the scope of the invention. These minerals may be Bauxite, Cerussite, Clinoptilolite, Corundum, Diaspore, Gibbsite, Halloysite, Hematite, Kyanite, Millerite, mixtures thereof and the like.

Due to the mineral being present throughout the reactor system, a concentration of metal ions at the equilibrium level is established throughout the system to constantly provide a source of metal ions which combine with the phosphates throughout the system to form insoluble precipitates. In addition, the level of such metal ions throughout the system contributes in controlling the pH of the system within the desired range of 6 to 8. Due to the hydraulics of the process, the active media with the one or more powdered minerals, is brought into contact with the waste waters throughout the system so that there is a constant formation of the phosphate precipitates.

The powdered minerals are preferably ground so that they pass through United States Standard Screen mesh size 50 to 300 or more. The more finely the mineral is divided, the larger the surface area on which the microorganisms and suspended solids may locate and be adsorbed thereon.

The waste waters when treated according to the processes of this invention are contacted with a mixture of active micro-organisms, one or more powdered minerals, precipitates, and other additives. This combination is referred to, as hereinbefore, as the active media.

With the attendant advantages of the process of this invention, sewage treatment system may be developed in various sizes ranging from that which may be installed in the basement of a single family dwelling to sizes which are capable of handling municipal waste waters, industrial waste waters and other sources of large volume of waste or raw waters.

FIG. 1 shows a schematic of a treatment system in which the process of the invention may be carried out. The system 10 comprises a first tank having an equalization zone or chamber 12, a second tank having a downflow zone or chamber 14 and an upflow sludge separation zone or chamber 16 and a third tank having a clarifying zone or chamber 18. Air is supplied to the various air pumps in the system 10 by air line 20. Waste waters enter the system 10 by pipe 22 which feeds into the equalization chamber 12. Equalization chamber 12 dampens the effect of wide variation in the flow rate of incoming waste waters on the hydraulics and liquid levels in the remainder of the system.

The level of the waste waters in the equalization chamber 12 may vary from level 24 up to level 26 without substantially affecting the levels in chamber 14 nor the sludge separation chamber 16. An air diffusser 28 is located between plate 30 and the wall of chamber 12 to promote mixing in the directions of arrows 32. The mixing of the raw incoming waste waters with the material already in the equalization chamber tends to level out extremes in the concentration of various types of contaminants.

The material in the equalization chamber 12 is pumped into chamber 14 by air pump 34. Depending on the type of air pump used the hydrostatic head can affect the flow rates through the pump. For higher levels of liquid in the equalization chamber the pump may transfer the liquid at a higher flow rate than when the liquid level is lower. The flow rate of the waste liquid through the pump 34 determines the flow rates of waste waters through the clarifier and, in turn, the flow rate of the effluent because the remainder of the system is balanced hydrostatically. It is understood, of course, where a constant flow rate of incoming waste water can be achieved and is at a rate so as not to upset the hydraulics of the remainder of the system, the equalization chamber 12 may be eliminated.

The chamber 14 is essentially isolated from the sludge separation chamber 16 by a slanted partition 36. Air diffusers 38 are positioned behind a partition 40 to draw active media and the processed waste water from underneath the sludge separation chamber and lift it upwardly through aeration channel 42. This air lift exposes over a brief period such active media to oxygen to thereby replenish dissolved oxygen content. The aerated waters flow out of channel 42 into the chamber 14 diagonally and downwardly in the direction of arrow 44 towards the throat 46 at the base of chamber 14. Due to the air diffusers 38 drawing liquid from the region underlying the sludge separation chamber 16, the velocity of the liquid increases as it passes through the throat 46 because it acts as a constriction to the flow. A portion of the liquid flowing across the bottom of the second tank flows upwardly in the direction of arrow 48 to expand a bed of active media in chamber 16 and with a sufficient upward flow rate of liquid, the bed of active media is expanded further to form a fluidized bed in the mid-region of the sludge separation zone 16. In addition, the upward flow of the liquid lifts active media settling at the lower region of the sludge separation chamber up into the fluidized bed area to maintain a high concentration of active micro-organisms in the fluidized bed of active media. The active media is therefore expanded or fluidized in this area for a particular flow rate of the waste waters as determined by the rate at which the air diffusers 38 pump the liquid up through channel 42 and as influenced by the rate at which pump 34 transfers liquid from the equalization chamber 12 into the chamber 14.

A minor portion of the aeration waste waters as it leaves channel 42 flows across the top of reactor chamber 14 and empties back into the equalization chamber 12 through the opening 50 provided in the partition 52 of the system. In this manner the active media including micro-organisms is introduced into the equalization chamber for purposes of beginning the biological and chemical degradation of contaminants in the waste waters and also to offset variations in concentrations of contaminants in the incoming waste waters.

The concentration levels of dissolved oxygen in the equalization chamber 12, the chamber 14 and the sludge separation chamber 16 vary a substantial amount to provide an aerobic environment in which the mixed population of micro-organisms oxidize the organics and nitrify the ammonia compounds to form nitrites and nitrates and to provide an essentially anoxic or anerobic environment in the same system whereby the mixed microbial population dentrify the nitrates and nitrites to form free nitrogen. The dissolved oxygen levels in the equalization zone are maintained at below 1 mg./l. In the upper portion of chamber 14, the dissolved oxygen levels are the highest due to the brief exposure of waste waters and active media to oxygen as they pass through aeration channel 42. The oxygen levels are usually in the range of 1 mg./l. up to 2 mg./l.

As the waste waters and active media flow downwardly in the zone 14, the level of dissolved oxygen decreases due to the take up of dissolved oxygen by the biological oxidation of degradable organics and the biological nitrification of the ammonia compounds. The downward flow rate of liquid is controlled by the pumping rate of air lift 38 so that the level of dissolved oxygen is reduced by the biological reactions to a level which may be less than 0.5 mg./l. in the throat area 46 of the reactor. This induces mixed microbial population to begin respiratory denitrification of the nitrites and nitrates to remove oxygen molecules therefrom. Zone 16 is essentially anoxic so that denitrification reactions are continued in this zone. The upward flow rate of liquid in zone 16 as controlled by air lift 34 discharging liquid into the second tank and by return 50, is such to complete a major portion of the biological denitrification reactions and continue the biological oxidation reactions which are capable of occuring in zone 16. Due to the efficiences of the developed fluidized bed of active media, the biological reactions may reduce the level of dissolved oxygen in zone 16 to nearly zero. The portion of the active media which flows along the bottom of the tank and a portion extracted from the fluidized bed as shown by arrow 54 is returned to the inlet of aeration channel 42. Above the fluidized bed area 48 the active micro-organisms, precipitates, minerals and other solids separate from the processed waste waters in the quiescent zone 57. The processed waste waters flow into the clarifier 18 via conduit 56.

The concentration of the micro-organisms in the active media can become high, particularly in the fluidized or expanded bed area of the sludge separation chamber due to the inherent efficiencies of a fluidized bed. It has been found that the concentration of active media in the mixed liquor is in excess of 20 mg./l. and can go as high as 200 gm./l. A major portion of the active media remains in the fluidized bed. Only the lighter portions and some suspended solids flow out through conduit 56 to clarifier 18.

Biochemical reactions can be carried out also in clarifier 18. To ensure that a sufficient amount of active micro-organisms are in the clarifier without relying on excess being transferred by conduit 56, air pump 58 is provided to pump active media which contain micro-organisms into clarifier 18 through conduit 60.

The clarifier serves to separate the suspended solids from the waste waters and to further reduce the level of contaminants in such waters to provide a clear odourless effluent with concentration of phosphates, nitrites, nitrates, ammonia and BOD which is safe for the environment.

The clarifier 18 has a fluidized bed of active media formed in the general area 62 by the arrangement of hydraulics shown in the drawings in the directions of the arrows. Air pumps 64 withdraw active media from the fluidized bed in the direction of arrows 66 and lift the liquid upwardly in annular aeration channel 68. The material flows over into and downwardly in channel 70 as it is combined with effluent coming from the sludge separation chamber 16. The quantity of dissolved oxygen in the processed waste waters in the channel 70 of the clarifier is below 1.0 mg./l. so that in essence the mixed microbial population in the fluidized bed finds itself in an anoxic environment. However, the micro-organisms are briefly exposed to oxygen in the aeration channel 68 to ensure the continuance of the biological reactions and to keep the micro-organisms alive.

The respiratory denitrification of the nitrites and nitrates is continued in the fluidized bed where remaining organic matter adsorbed on the particulate mineral surfaces serve as a source of carbon to support the biological reactions. As the material exits from channel 70, it flows upwardly in the direction of arrows 71. The configuration of the chamber 18 with the outwardly sloping sidewalls, assists in establishing an expanded bed or a fluidized bed of active media in area or region 62. Above the expanded bed of active media, a layer 72 of light particles or excess sludge which contain little or no mineral particles is established, from which a portion of solids is extracted by collector 74 and either returned to the aeration chamber 14 by conduit 76 or a portion thereof discarded by conduit 78.

Flocculating agents, activated carbon and coagulants may be added to complete the removal of phosphates and other undesirable suspended solids and to improve the clarity of the water in the upper portion 80 of the clarifier. Particularly useful flocculating agents are cationic polyelectrolyte type such as "Catfloc" (trademark) sold by Calgon Corporation. The ratio of activated carbon to mineral, added to improve clarity may range from 1:10 up to 1:3. The amount of alum added to complete phosphate removal when desired may range from 20 to 200 gm./l. of effluent. Solids floating on the top of the water are removed by skimmer 82 and returned to the chamber 14 by conduit 84. The effluent leaves the clarifier by conduit 86 where floating solids are separated from the effluent by trap 88.

The powdered mineral or minerals may be added to chamber 14 and/or the clarifier 18. The hydraulics of the system assist in circulating a portion of the mineral amongst the tanks of the system. A desired concentration for the minerals in the system is from approximately 10 gm./l. up to 200 gm./l. As discussed, in the fluidized bed area 62 the top layer 72 thereof contains predominately the biological solids mixed with precipitates. There may be some mineral present in layer 72. This is mostly very fine particles of mineral which have become trapped in coagulated precipitates. The lower portion of the fluidized bed contains the major portion of the powdered minerals thus any excess sludge which is removed from skimmer 72 is mostly non-degradable solids, excess biological solids, formed precipitates and possibly a very minor portion of mineral. All or a portion of the material removed by skimmer 72 may be recirculated to the aeration chamber via conduit 76. Conduit 78 is provided for purposes of discarding a portion of the skimmed material by skimmer 74. In instances when material is discarded, it can be appreciated that a minor amount of very fine mineral particles will be removed from the system. Depending upon the demands on the system, it may be necessary to replenish mineral in the system from time to time when sludge is withdrawn. When the unit is adapted for household use, small quantities of sludge may be discarded from the system approximately every six months or a year. It can therefore be appreciated that if necessary the addition of mineral to the system is on an infrequent or irregular basis and that insofar as the addition of any major quantities to the system, it can be considered as essentially on a one time basis at initial system start-up.

As mentioned, on a continuous basis, a portion of the active media is withdrawn from the fluidized bed and briefly exposed to oxygen in the aeration channel 64 to ensure the continued biological reactions and in particular the bioxidation of remaining organic matter and ammonia in the fluidized bed. A small amount of active media is recirculated to the clarifier via lines 60 and 61 to supplement the active micro-organisms in the clarifier. The organic matter already present in the waters and which may be adsorbed on the mineral surfaces, provides a necessary source of carbon to maintain the activity of the micro-organisms in the fluidized bed of the clarifier. However, when required, the activity of the micro-organisms may be increased by adding methanol or some other acceptable source of carbon to satisfy the diet of the micro-organisms.

The purification process according to this invention provides a multi-stage process in which due to the varying concentrations of dissolved oxygen throughout the system, the particular hydraulics or flow pattern, the presence of mineral in the active media, there is simultaneous removal of biodegradable organics, nitrogen containing compounds and phosphates from the waste waters to provide a clarified effluent which in most instances is safe for discharge into the environment. As can be appreciated, where necessary, the clarified effluent may be disinfected by ozone treatment of the like or other steps may be taken in treating the clarified effluent as required by various government bodies. The process provides for building up in a single system, a mixed microbial population by retaining and growing in the reactor the various micro-organisms on the surfaces of the mineral particles, due to a major portion of the mineral remaining indefinitely in the system. There are no interruptions in the flow pattern of the waste waters as they are treated and they are always in contact with minerals to provide for the continuous precipitation of phosphates. The mineral surfaces as mentioned, serve to attract to the surfaces, the micro-organisms and adsorb thereon micro-organisms to provide sites on which they may grow and also serve to attract to their surfaces, the various organic, nitrogen and phosphourous material to substantially enhance the biological and chemical reactions. The aspect of the mineral being present throughout the system provides a constant source of metal ions to provide a stage-wise precipitation of the phosphates and thereby substantially reduce or essentially eliminate need for use of other types of chemicals such as alum for precipitating phosphates.

The system can be considerably miniaturized for use in limited quarters such as treatment of domestic sewage in apartment buildings, town house developments, single family dwellings and the like. It is understood however that the system can also be enlarged to handle very large volumes of municiple waste waters.

EXPERIMENTAL SET-UP

Figure 2:
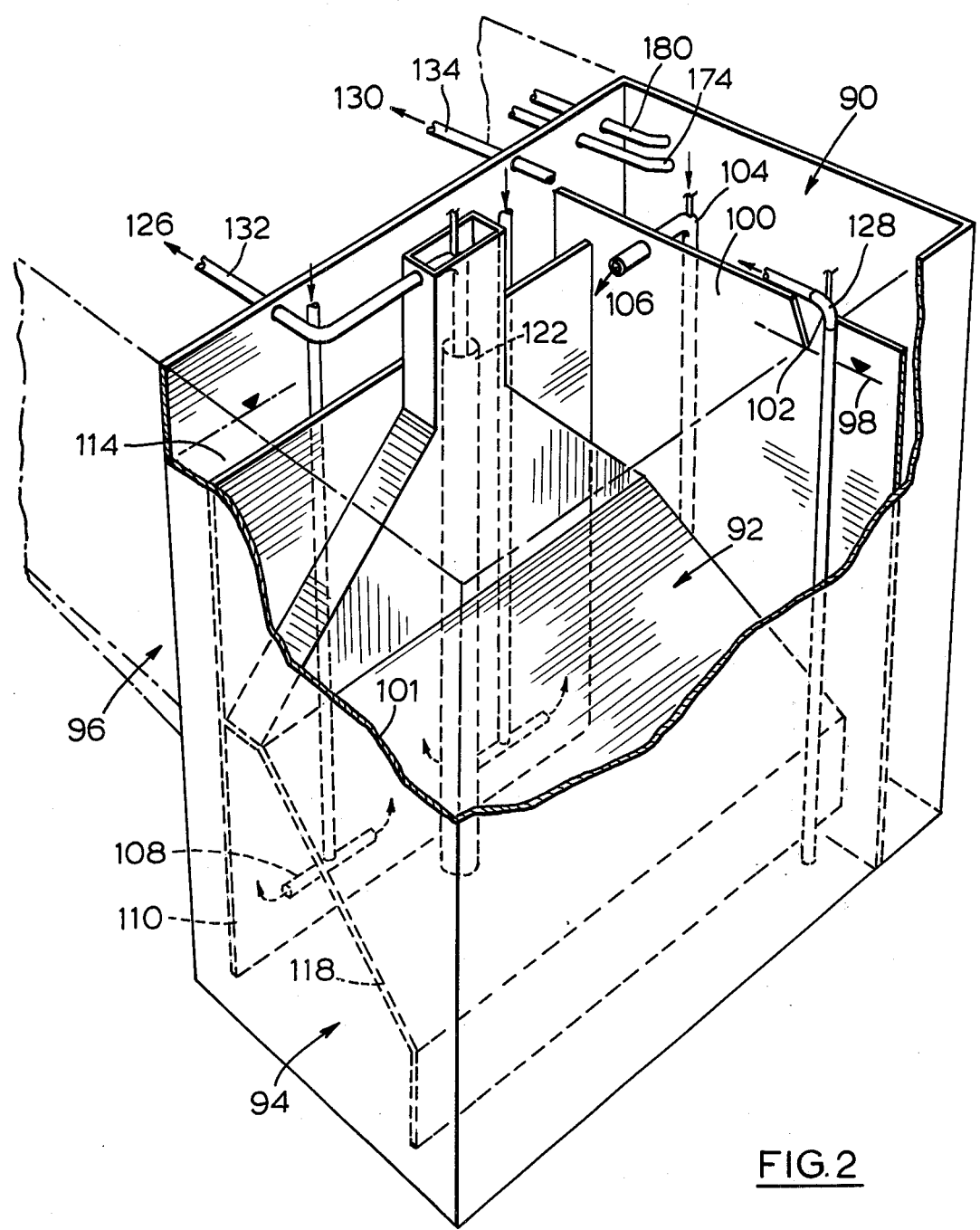
FIG. 2 is a partially cut away perspective view of the equalization and aeration chamber of an apparatus used to experimentally demonstrate the utility of the process.

FIGS. 2 through to 4 show an experimental apparatus to exemplify the process as discussed in Example 3 (following) for the treatment of domestic sewage. There is an equalization chamber 90, a downflow chamber 92, and a sludge separation chamber 94. The clarifying chamber is located at the back as shown in shadow at 96. This system is therefore analogous to and functions in the same manner as the system schematically shown in FIG. 1. Raw sewage waters are fed into the equalization chamber 90 where the level in the equalization chamber may go as high as level line 98. The equalization chamber 90 is separated from chamber 94 by partition 100. The processed waste waters in chamber 92 are returned to the equalization chamber 90 via the V-shaped opening 102 provided in the partition 100. The mixture of active media and raw sewage waters in the equalization chamber is lifted into chamber 92 by air pump 104 and discharged in the direction of arrow 106.

The rate at which air pump 104 pumps the waste waters into chamber 92 varies depending on the height of hydrostatic head of the waste liquid in the equalization chamber. If there is a large influx of waste waters to raise the level in the chamber 90, the air pump 104 pumps at an increased rate, however, the equalization chamber 90 serves to dampen extremes in flow rates of incoming raw sewage.

The active media is circulated through chamber 92 and sludge separation chamber 94 by way of air diffusers 108 which are placed behind a partition 110. An intake 112 is provided at the base of the reactor as more clearly shown in FIG. 4. An aeration channel 114 is defined between the partition 110 and the backwall 116 of chamber 92. Waste waters and active media are lifted up through channel 114 by air diffusers 108 and split over the top of partition 110 into chamber 92. This aspect briefly exposes the waste waters to oxygen for the previously mentioned reasons. The waste waters and active media move downwardly in chamber or zone 92 and are caused to flow to the front of the chamber in direction of arrow 117 by slanted baffle plate 118. The waste waters travel into the sludge separation chamber 94 through gap 120 at the base of baffle 118. The gap 120 constitutes a constriction to the flow of liquid so that the velocity of the liquid is increased as it flows across the tank bottom, a portion of which rises in direction of arrow 121 to thereby create a fluidized or expanded bed in sludge separation chamber 94. The mineral present in the active media assists in retaining the active micro-organisms in the fluidized bed due to the adsorption of the bacteria. In the upper portion of chamber 94, skimmer 112 with air lift takes off the processed waste waters and transfers them by air pump 124 through the conduit 132 in the direction of the arrow 126. Air pump 124 determines the rate at which liquid flows upwardly in the sludge separation zone to thereby determine the extent of the expanded bed or upon sufficient expansion forming a fluidized bed of the active media. On the other hand it is principally the air diffusers 108 which provide an air lift in the aeration channel which determines the rate at which the liquid flows downwardly through chamber 92. As previously explained, this rate is controlled so as to ensure that the oxygen levels at the lower end of the aeration zone have been reduced by the biological reactions to a level of approximately 0.5 mg./l. or less to thereby initiate the biological denitrification reactions which are principally carried out in the sludge separation zone. A small portion of active media may be continuously circulated from chamber 92 to the clarifier 96 by way of air pump 126 through conduit 134 in the direction of arrow 130.

Figure 3:
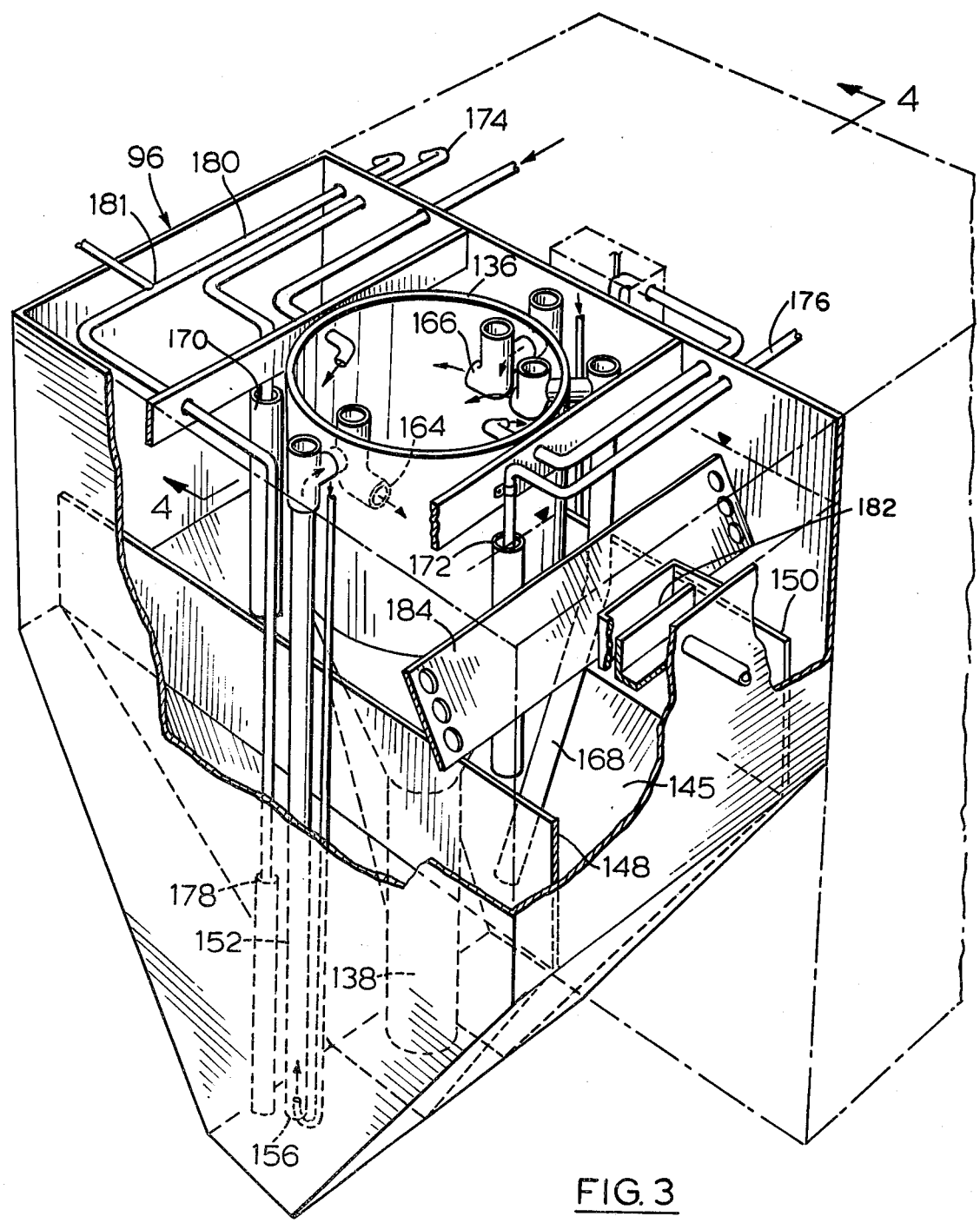
FIG. 3 is a cut away perspective view of the clarifying chamber for use in combination with the apparatus of FIG. 2.
Figure 4:
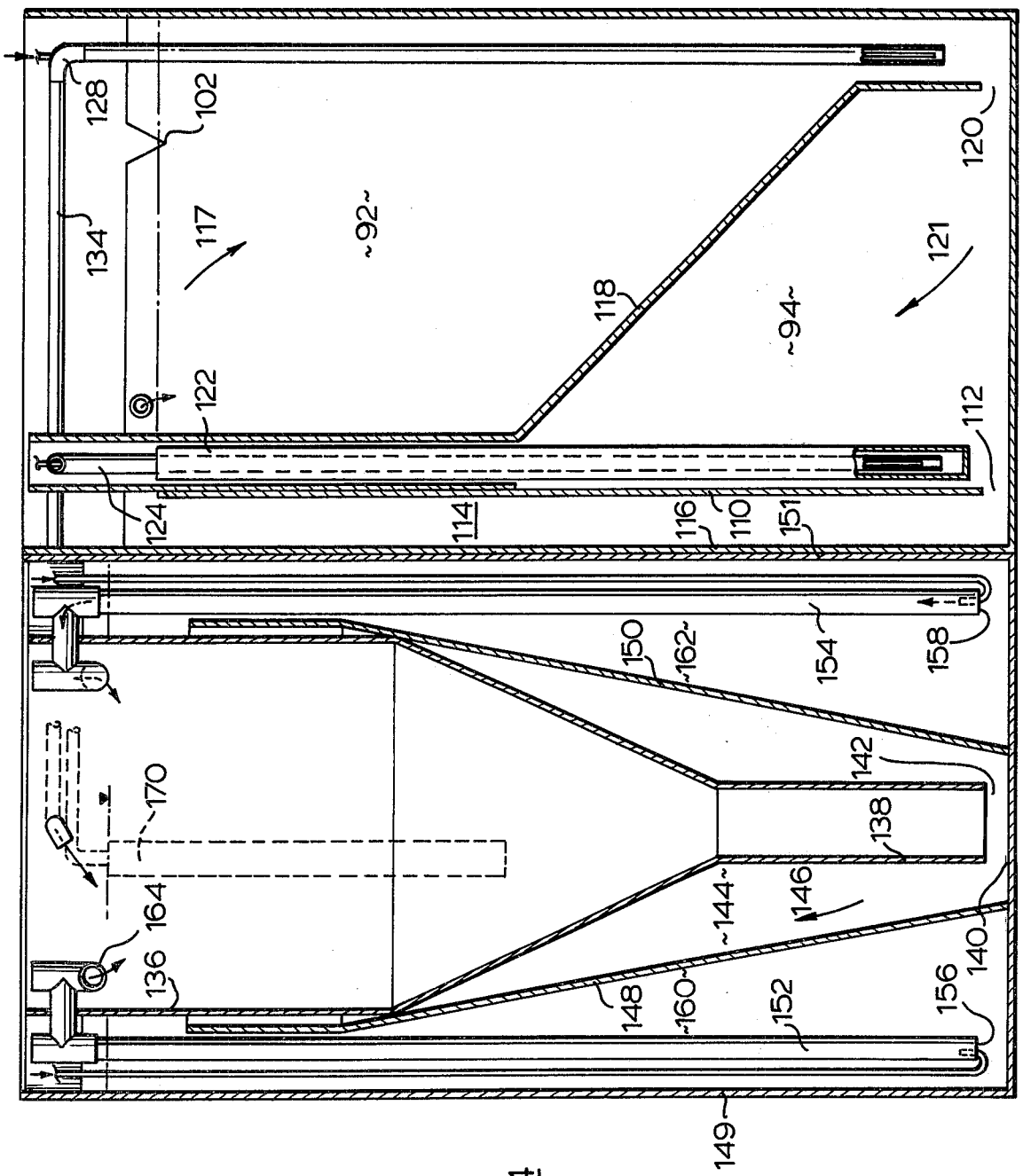
FIG. 4 is a section taken along the lines 4—4 of FIG. 3.

Turning to FIG. 3, the active media and processed waste water enter the clarifier chamber 96 via a funnel-shaped downflow channel 136. The base 138 of the funnel-shaped channel is above the bottom 140 of the clarifier tank to define a gap 142 as shown in FIG. 4. From this point the material flows upwardly in the direction of arrow 146 to create a fluidized bed of active media in the area 144. Slanted plates 148 and 150 define a chamber 145 which extends upward a sufficient distance to provide a volume of adequate size to ensure the formation and maintenance of a fluidized bed in chamber 145. Air lifts 152 and 154 are located between plates 148 and 150 and the respective outside walls 149 and 151 of the clarifier. The upper edges of plates 148 and 150 may function as weirs in controlling the flow of liquid from the fluidized bed into the sludge settling zones 160 and 162. The air lifts have intakes at 156 and 158 to withdraw material from the base of the sludge settling chambers 160 and 162 and lift the material upwardly and direct it into the funnel-shaped chamber 136. The location of intakes 156 and 158 assist in the settling of sludge in chamber 160 and 162. The openings 164 and 166 are directed in a manner so as to cause the material in the funnel-shaped channel 136 to form a vortex to assist in the mixing of the material. The lifts 152 and 154 add some oxygen to the active media for previously mentioned purpose so that the biological oxidation of contaminants may continue as the active media and waste water descends in chamber 136.

A portion of active media and waste water from the fluidized bed 144 is lifted directly from its upper region by air lift 168 and dumped into chamber 136 to ensure a level of active media in the downflow portion of funnel shaped chamber 136 and to maintain the fluidized bed.

Floatable solids are skimmed off the surface by skimmers 170 and 172 and returned to chamber 92 and to the equalization chamber by conduit 174 and 176. A portion of the sludge is extracted from mid-level in sludge settling chamber 160 by air lift 178 and returned to the equalization chamber by pipe 180. Some of the returned sludge may be discarded through T-junction 181 in pipe 180. As explained with respect to the clarifier of FIG. 1, the discarded sludge may contain some mineral thereby necessitating from time to time the replenishing of a minor amount of the finely divided mineral.

The clarified effluent which is above the fluidized bed area 146 and the sludge settling chamber 148 is removed from the clarifier by separator 182. A baffle plate 184 is located beneath the separator 182 to deflect the upflowing lighter suspended solids of the fluidized bed away from the separator 182.

The effluent from separator 182 may be collected in a sump and periodically pumped from the sump for discharge. As previously discussed, flocculating agents and chemicals which cause precipitation of ion species in the waste waters may be added to the clarifying chamber. The addition of these treatment materials may be by metering pump where the quantity added is based on the quantity of effluent. It follows that with the use of a sump for collecting effluent, each time the sump pump is activated to discharge a predetermined quantity of effluent, the metering pump can be activated to dispense the desired quantites of treatment chemicals.

EXAMPLE 1

This example illustrates the effect the addition of a mineral's effect demonstrated herein applies similarly in waters present in a sewage treatment system contemplated by this invention. Experiments were carried out using commercially available powdered minerals which were as follows:

| MINERAL | SOLUBILITY |
|---|---|
| aluminum oxide | less than or equal to 1 mg./l. |
| aluminum hydrate | less than 1 mg./l. |
| iron oxide | less than 1 mg./l. |
| iron sulphide | less than 5 mg./l. |
| and zinc sulphide | less than 3 mg./l. |

A solution of phosphates were prepared by using tap water and sodium phosphate having the formula $NaH_2PO_4H_2O$ to provide a phosphate concentration of 50 mg./l.

A 100 ml. volume of the phosphate was provided in a 250 ml. flask for each experiment. Added to the 100 ml. solution, was 3000 mg. of selected mineral to provide a concentration of 30 gm./l. for the mineral in each experiment. The sample in each experiment was stirred for two hours, then left standing. After 24 hours and after 120 hours a ten ml. sample of supernatent from each flask was taken and the residual concentration of phosphate in the supernatent determined by spectro-photometric technique. The reduction of phosphate achieved during the first 24 hours is attributed to the combined affect of adsorption of phosphates on the mineral surface and chemical precipitation. Once the adsorption mechanism reached equilibrium the remainder of the phosphate removal is attributed to chemical precipitation so that the reduction achieved after the initial 24 hours is principally due to the chemical precipitation by the released metal ions. The results of the experiment are shown as follows in Table 1. It should be noted that the dissociation of the minerals in each instance range from less than 1 part per million up to 5 parts per million which are designated above.

Table 1

| SAMPLE NO. | INITIAL CONTENT OF PO4 IN SOLUTION | VOLUME OF SOLUTION | TYPE OF MINERAL ADDED TO SOLUTION | MINERAL ADDED | CONCENTRATION OF PO4 AFTER 24h CONTACT mg./l. | PO4 REMOVED % | CONCENTRATION OF PO4 AFTER 120 HRS. CONTACT mg./l. | PO4 REMOVED % |
|---|---|---|---|---|---|---|---|---|
| 1 | 50 | 100 | NONE | — | 50 | 0 | 50 | 0 |
| 2 | 50 | 100 | $Al_2O_3$ | 3000 | 25.3 | 49.4 | 21.5 | 57 |
| 3 | 50 | 100 | $Al_2O_3 3H_2O$ | 3000 | 28.0 | 44.0 | 25.0 | 50 |
| 4 | 50 | 100 | $Fe_2O_3$ | 3000 | 27.0 | 46.0 | 24.0 | 52 |
| 5 | 50 | 100 | FeS | 3000 | 15.0 | 70.0 | 2.5 | 95 |
| 6 | 50 | 100 | ZnS | 3000 | 14.0 | 72.0 | 7.0 | 86 | mineral has on the settling rate of the active media. Turning to FIG. 5, Curve 1 shows the settling time for standard activated sludge; Curve 2 shows the settling time for the combination of standard activated sluge with activated carbon; and Curve 3 shows the settling time for the combination of mineral, activated carbon and active micro-organisms. Curve 3 is substantially below Curve 1. It is therefore apparent that the addition of minerals to the active micro-organisms substantially increases the density of the active media so as to assist in the settling of sludge.

EXAMPLE 2

This example demonstrates the aspect of mineral's presence in the water being capable of precipitating phosphates present in such water. It is appreciated the

EXAMPLE 3

The experiment apparatus of FIGS. 2, 3 and 4, was used to treat raw domestic sewage from an apartment building in Toronto, Canada. The total volume of sewage processed varied from 100 to 360 Imp. Gallons per day on a batch-wise flow basis.

For purposes of comparsion, three experimental runs were carried out. Run #1 was a 7 day operation, Run #2 was a 24 hour operation and Run #3 was a thirty day operation. Runs #1 and #3 had the mineral Gibbsite added to the active micro-organisms together with powdered activated carbon, coagulant and alum. Run #2 had all the ingredients of Run #1 plus the addition of methanol to the clarifier. The flocculating agent activated carbon and alum were added to achieve maximum clarity of the effluent.

The operating parameters are listed in Table 2 and the results of the tests are listed in Table 3. Average values are noted for samples taken.

TABLE 2

| OPERATING DATA | RUN #1 | RUN #2 | RUN #3 |
|---|---|---|---|
| TOTAL SYSTEM'S VOLUME (Imp. Gal.) | 350 | 350 | 350 |
| REACTOR AND SLUDGE SEPARATION CHAMBER VOLUME (Imp. Gal.) | 240 | 240 | 240 |
| CLARIFYING CHAMBER VOLUME (Imp. Gal.) | 110 | 110 | 110 |
| FLOW RATE OF SEWAGE (Imp. Gal./Day) | 100–200 | 100–200 | 100–400 |
| PROCESS AIR (SCFM) | 6 | 6 | 6 |
| DISSOLVED OXYGEN: | | | |
| Aeration Chamber (mg./l.) | 1.0–2.0 | 1.0–2.0 | 1–5 |
| Clarifier (mg./l.) | 0.0–1.0 | 0.0–1.0 | 0.0–4 |
| SUSPENDED SOLIDS | | | |
| Aeration Chamber (g./l/) | 100 | 100 | 30 |
| ACTIVE MEDIA | | | |
| Mineral - Gibbsite (lb.) | 200 | 200 | 60 |
| Activated Carbon (lb.) | 30 | 30 | 30 |
| Micro-organisms | Yes | Yes | Yes |
| TREATMENT CHEMICALS | | | |
| Alum (mg./l. of effluent) | 100 | 100 | 100 |
| "CATFLOC: (mg./l. of effluent) | 5 | 5 | 5 |
| Methanol (mg./l. of effluent) | — | 300 | — |

TABLE 3

| WATER QUALITY | RAW SEWAGE | RUN #1 | % REMOVED | RUN #2 | % REMOVED | RUN #3 | % REMOVED |
|---|---|---|---|---|---|---|---|
| SUSPENDED SOLIDS (mg./l.) | 40–400 | <3.0 | 99 | 3.0 | 99 | 5.7 | 98 |
| TOTAL DISSOLVED SOLIDS (mg./l.) | 300–600 | <500 | — | <500 | — | <596 | — |
| TURBITY (NTu) | 80–160 | <0.7 | 99 | <0.5 | 99+ | <0.7 | 99+ |
| BOD$_5$ (mg./l.) | 200–400 | <2.0 | 99+ | <2.0 | 99+ | <3 | 99+ |
| NH$_3$-N (mg./l.) | 10–30 | <0.1 | 99+ | 1.0 | 96.6 | <.1 | 99+ |
| NO$_3$-N (mg./l.) | 0.1–0.2 | 10–15 | — | 1.5 | — | 15.6 | — |
| PO$_4$-P (mg./l.) | 4–10 | <0.1 | 99 | <0.1 | 99 | .08 | 99+ |
| pH | 7–8 | 7.0–7.5 | | 7.0–7.5 | | 7.5 | — |

Referring to Table 3 it can be seen that the concentration of phosphates in the effluent has been reduced by more than 99% in all three runs. Alum was used and dosed into the clarifier in each run for reasons to achieve the removal of phosphorous below 0.1 mg./l. in the effluent. To emphasize the effect of the mineral on removal of phosphates consideration has to be given to the quantity of alum required to achieve the 99+% removal efficiency by the prior art processes. It is accepted (Environmental Engineers Handbook, Vol. 1, Water pollution, Shulton Book Co. Pennsylvania 1974, 1290) that for concentration of b 10 mg./l. of phosphorous in raw sewage and removal efficiency of above 95%, the ratio of alum to phosphorous for removed efficiences greater than 95% must exceed 22:1. There is essentially an exponential increase in the required ratio of alum to phosphorous for removal efficiencies greater than 95%.

Considering the concentration of phosphates in the treated raw sewage, the batch-wise flow of the incoming sewage, the achieved reduction of phosphorous of less than 0.1 mg./l. in the effluent, the used alum to phosphorous ratio of only 10:1 to 15:1, it is apparent that the quantity of alum used in these runs was much less than that required by the prior art processes. The reduction in consumption of the alum required to achieve the 99+% removal officiency can be attributed only to the effect of the powdered mineral present.

It is therefore established that the mineral present in the system provides substantial removal of phosphorous from the processed sewage and consequently for a significant reduction in alum required to achieve the removal efficiency of 99+% for phosphorous in the effluent at below 0.1 mg./l.

As seen from Table 3 the ammonia nitrogen in Run #1 was substantially removed however, there was still a high level of nitrates in the effluent. The addition of the methanol to the clarifier, as seen from Run #2 increased the activity of the micro-organisms to a point where reduction of nitrates down to 1.5 mg./l. was achieved.

The results of Run #3 show, that regardless of the level of phosphates in the raw sewage varying from 4 to 10 mg./l. (as P) the removal efficiency of phosphorous was always at or above 99%. It should be noted that with respect to the dissolved oxygen concentration in the aeration zone and clarifier as reported with respect to Run #3, on occassion went as high as 5 and 4 mg./l. respectively. These values are outside of the desirable operating range of the system, however, they came about due to unattended operation of the experimental apparatus which was not equiped with automatic control on the dissolved oxygen concentration and which was fed raw sewage on a batch-wise basis.

Although the preferred embodiments of the invention have been discussed herein in detail, it will be understood by those skilled in the art that variations may be made to the inventive process without departing from the spirit of the invention or the scope of the appended claims.

What I claim is:

1. A purification process for the removal of biodegradable suspended and dissolved organic solids and nitrogenous compounds, and phosphates from contaminated waters by bioligical and chemical reactions carried out simultaneously in the presence of an active media which includes mixed microbial population and powdered minerals in a reactor system operating at a pH range of 6 to 8; said process comprising:

(i) adding to the system on an infrequent basis a finely divided mineral or mixture of minerals of a particle size less than 50 mesh United States Standard Screens to provide a concentration of mineral in such active media ranging from approximately 10 gm./l., up to approximately 200 gm./l., the selection of mineral being determined by the characteristics of:

(a) its being non-toxic to the micro-organisms (b) having surfaces which attract micro-organisms, and adsorb organic compounds and phosphates to assist in and expedite the simultaneously occurring biological and chemical reactions, (c) having limited solubility in the processed waste waters, where the metal ions released by the mineral's dissociation in such waters react with phosphate ions present in the processed waste waters to form insoluble metal phosphates at the reactor pH range of 6 to 8; and (d) minerals having said characteristics are selected from the group consisting of Bauxite, Cerussite, Clinoptilolite, Corundum, Diaspore, Gibbsite, Halloysite, Hematite, Kyanite, Millerite, and mixtures thereof;

(ii) building up a mixed microbial population by retaining and growing in the reactor the various micro-organisms present in the waste waters on the surfaces of the mineral particles retained in the reactor system;

(iii) circulating by the use of forced air the contaminated waters and the active media which includes the mixed microbial population and powdered minerals through the reactor system which comprises at least two zones in which biological oxidation, biological nitrification, and biological denitrification reactions each occur simultaneously with the chemical reactions throughout the system and in which the concentration of free metal ions of the minerals is at the mineral's solubility levels;

(iv) such circulation involving flowing such contaminated waters downwardly through the first zone to contact such waters with the active media and (a) maintaining the concentration of dissolved oxygen in the zone's upstream region at approximately 1 mg./l. to 2 mg./l., to support the biological oxidation of bio-degradable organic solids to carbon dioxide and the biological oxidation of nitrogenous compounds to nitrites and nitrates, (b) controlling the duration which such waters remain in said first zone as they flow therethrough so that the biological reactions reduce the concentration of dissolved oxygen in the downstream region of the first zone to below 1 mg./l. to thereby induce biological denitrification reactions;

(v) flowing at least a portion of such waters and the active media from said first zone upward through a second zone which is a sludge settling zone, and continuing the biological denitrification reactions for reducing the concentration of nitrites and nitrates wherein the second zone the concentration of dissolved oxygen is reduced to less than 0.5 mg./l.;

(vi) controlling the upward rate of flow of such waters in the second zone to provide a quiescent region which permits most of the active media to separate from such waters prior to discharge of such waters from the reactor system;

(vii) simultaneously in the first and second zones, precipitating a major portion of the phosphate ions by the reaction of said metal ions which are released by dissociation of said mineral with the phosphate ions to form insoluble precipitates at the reactor pH range of 6 to 8 to thereby lower the concentration of phosphate ions in the zones of the system; and (viii) transferring the reactor effluent containing suspended solids from the quiescent region of said second zone to a reactor-clarifier, said reactor-clarifier having first and second vertically extending chambers, said second chamber being in fluid flow communication with said first chamber at the lower end of said first chamber, establishing a flow path of liquid downwardly through said first chamber and upwardly through said second chamber by withdrawing and aerating a portion of active media from said second chamber and returning it to the upstream end of said first chamber to maintain a dissolved oxygen concentration in the first chamber at approximately 1.0 mg./l., the upward flow in said second chamber being sufficient to develop a fluidized bed of active media where the withdrawal of active media from said second chamber is from the developed fluidized bed, completing biological and chemical reactions in such first and second chambers and separating the suspended solids from the processed waters flowing out of said second chamber and discharging such clarified waters.

2. A purification process of claim 1 where an equalization zone is added before said first zone, flowing contaminated waters to be treated into said equalization zone, mixing the content in this zone by air, constantly flowing a portion of such waters from said equalization zone into said first biological oxidation zone, recirculating a portion of active media from said first biological oxidation zone to said equalization zone to begin the various biological and chemical reactions in said equalization zone, and maintaining the concentration of dissolved oxygen in the equalization zone at below 1.0 mg./l.

3. A purification process of claim 1 wherein a portion of active media from said first zone is constantly transferred to said reactor-clarifier to establish and maintain a level of active media therein.

4. A purification process of claim 1 further comprising adding activated carbon to such waters in a ratio of activated carbon to mineral ranging from 1:10 up to 1:3, said activated carbon being powdered or granulated.

5. A purification process of claim 1 further comprising adding alum to the fluidized bed of activated sludge to assist in the removal of phosphates from contaminated waters, to quantity of alum ranging from approximately 20 to 200 mg./l.

6. A purification process of claim 1 further comprising adding a source of carbon to said reactor-clarifier to assist in the respiratory denitrification of nitrites and nitrates, said source of carbon being digestable by the micro-organisms of the active media.

7. A purification process of claim 1 wherein a portion of the active media withdrawn from the upper level of the fluidized bed is returned to said first zone of said reactor system.

8. Purification process of claim 1 wherein the selected mineral is Bauxite.

9. Purification process of claim 1 wherein the selected mineral is Gibbsite.

* * * * *